United States Patent
Gherman et al.

(10) Patent No.: US 6,591,622 B1
(45) Date of Patent: Jul. 15, 2003

(54) AUTOMATIC TEMPERATURE CONTROL

(75) Inventors: George Gherman, Täby (SE); Johnny Kornelind, Tyresö (SE)

(73) Assignee: Dometic Appliances AB, Solna (SE)

( * ) Notice: Subject to any disclaimer, the term of this patent is extended or adjusted under 35 U.S.C. 154(b) by 0 days.

(21) Appl. No.: 09/830,874
(22) PCT Filed: Nov. 21, 1999
(86) PCT No.: PCT/SE99/01897
§ 371 (c)(1),
(2), (4) Date: Jun. 18, 2001
(87) PCT Pub. No.: WO00/28395
PCT Pub. Date: May 18, 2000

(30) Foreign Application Priority Data

Nov. 5, 1998 (SE) .............................................. 9803789

(51) Int. Cl.$^7$ ............................. F25B 1/00; F25B 49/00; F25B 41/00; F25B 29/00; G05D 23/32
(52) U.S. Cl. .............................. 62/229; 62/158; 62/126; 62/208; 165/265; 236/46 R; 236/91 F
(58) Field of Search .......................... 62/126, 158, 229, 62/208; 165/265; 236/91 F, 46 R

(56) References Cited

U.S. PATENT DOCUMENTS

| | | | | |
|---|---|---|---|---|
| 4,481,789 A | * | 11/1984 | Akimoto et al. | 236/91 F |
| 4,843,833 A | * | 7/1989 | Polkinghorne | 62/126 |
| 4,898,230 A | * | 2/1990 | Tsuchiyama et al. | 165/265 |
| 4,934,593 A | * | 6/1990 | Meyer | 236/46 R |
| 5,355,686 A | * | 10/1994 | Weiss | 62/158 |
| 5,713,213 A | * | 2/1998 | Nobuta et al. | 62/126 |

* cited by examiner

Primary Examiner—William C. Doerrler
Assistant Examiner—Filip Zec
(74) Attorney, Agent, or Firm—Pearne & Gordon LLP

(57) ABSTRACT

A method and device (18) to control the temperature T in a refrigerator or freezer cabinet (10), which keep a set temperature in a space (12) in the cabinet. The space is refrigerated by an element (14) of an intermittently operating refrigerating machine (16). The refrigerator cabinet has a control gear (18), which consists of a first means (20) and a second means (22), a third means (24) and a fourth means (26). The first means is situated at the refrigerating element, which is placed in the space, and it measures a regulating temperature. The second means is arranged at a reference point in the space, and it measures a current temperature in the space. The third means compiles an average temperature of the current temperatures. The forth means compiles a discrepancy between the average temperature and a preset temperature. When this discrepancy is greater then a predetermined value for discrepancies, the connect and/or disconnect temperatures are changed so that the temperature in the space approaches the preset value.

12 Claims, 3 Drawing Sheets

AUTOMATIC TEMPERATURE CONTROL

This application claims the benefit of International Application Number PCT/SE99/01897, which was published in English on May 18, 2000.

FIELD OF TECHNOLOGY

The present invention relates to a method and a device for controlling temperature in a certain space, more specific, for automatic regulation of temperature in a refrigerator and/or freezer cabinet having thermostat-controlled operation.

TECHNICAL STATE OF THE ART

Mechanical and electronic thermostats of today have fixed connect temperature (the refrigerating machine is turned on) and disconnect temperature (the refrigerating machine is switched off). This implies that the average temperature of the refrigerated space is controlled by setting a desired temperature, i.e. by manually moving (the setting means for) connect and/or disconnect temperature upwards or downwards. These connect and disconnect temperatures have been chosen after tests (carried out) on a limited number of prototypes, and the average temperature of the (refrigerated) space can vary from one application to another, based on constructive disparities. The variations in the ambient temperature, and/or atmospheric pressure, can furthermore result in different temperatures in the refrigerated space, at the same connect and disconnect temperatures set, particularly when the connect and disconnect temperatures are (measured as) evaporator temperature. There is no feed-back coupling; the temperature of the (refrigerated) space do not influence the connect and disconnect temperatures.

DESCRIPTION OF THE INVENTION

A problem which the present invention solves is that it can keep a temperature set in the (refrigerated) space. Another problem the invention solves is that it automatically adjusts the temperature to the set temperature.

The object of the present invention is to control the temperature in a refrigerating application, which performs its function thermostatically in a manner resulting in that the average temperature in the refrigerated space, during a period, is equal to the set temperature (preset temperature.

The present invention has reference to automatic regulating the temperature of the space, which temperature varies over the time. The temperature of the space drops as the refrigerating machine generates coldness, and rises when the refrigerating machine does not.

The system aims at getting an average temperature equal to a preset temperature. In the beginning the system measures a temperature in the space several times during the course of a period, in order to get the average temperature during that period. The system has a connect and a disconnect temperature to control the operation of the refrigerating machine, so that the average temperature will be equal to the preset temperature. This is attained by moving the connect and/or disconnect temperatures upwards or downwards, depending on the difference between the average temperature of the space and the preset temperature. This removal of the connect and/or disconnect temperatures, make the system aiming at an average temperature, which after the next period or periods is equal to the preset temperature. The difference between the average temperature of the period and the preset temperature is a discrepancy, which act to cancel the difference itself. In case the discrepancy between the period's average temperature and the preset temperature is greater than a certain discrepancy value, the connect and/or disconnect temperatures are moved upwards or downwards in order to cancel the difference, and subsequently get an average temperature equal to the preset for the next period or periods.

In principle the system works in the following manner: The automatic system for temperature regulating checks the operation of the refrigerating machine. The refrigerating machine can be of different kinds, i.e. of absorption or compression type. The system notice a regulating temperature within a certain periodicity, and compares this with current connect and disconnect temperatures. The refrigerating machine is turned on when the regulating temperature rises above the connect temperature and switched off when the regulating temperature drops below the disconnect temperature. The refrigerating machine is run thermostatically by means of a thermostat function characterized in the above mentioned connect and disconnect temperatures. The temperature of the refrigerated space, which is the controlled temperature, varies under stable conditions during a period. The system carries out a continuous calculation of the average temperature value in the refrigerated space within a period, designated "j". A complete period comprises one "on" time interval $P_{on}$ and one "off" time interval $P_{off}$. The latest calculated average temperature, at the end of the period, is the average temperature of the period. The system calculates a discrepancy between the average temperature and the preset temperature. When the discrepancy is greater than a predetermined value for discrepancies, the temperature for connect and/or disconnect are changed according to a predetermined standard, to have the discrepancy reduced below the predetermined value.

This invention can be used in all refrigerating applications (based on whatever refrigerating technique), which generate coldness within a certain space, and which functions thermostatically, e.g. as controlling electronics to an absorption wine refrigerator cabinet.

The present invention keeps the refrigerated space at an average temperature essentially equal to the preset temperature, independent of differences in constructions between the applications (space, thermostat, and so on) and variations in the ambient temperature.

An advantage of the present invention is that the average temperature of the refrigerated space influences the connect and/or disconnect temperatures, i.e. there is a feed-back. A further advantage oc the present invention is that the system in itself adjusts the connect and/or disconnect temperatures, as the ambient temperature varies, whereby heat leakage variations will be compensated for, and the refrigerated space countinues having an average temperature essentially equal to the preset temperature.

The invention will now be described in detail by way of preferred embodiments and with reference to the attached drawings.

PREFERRED EMBODIMENT OF INVENTION

A First Embodiment

Figure 1:
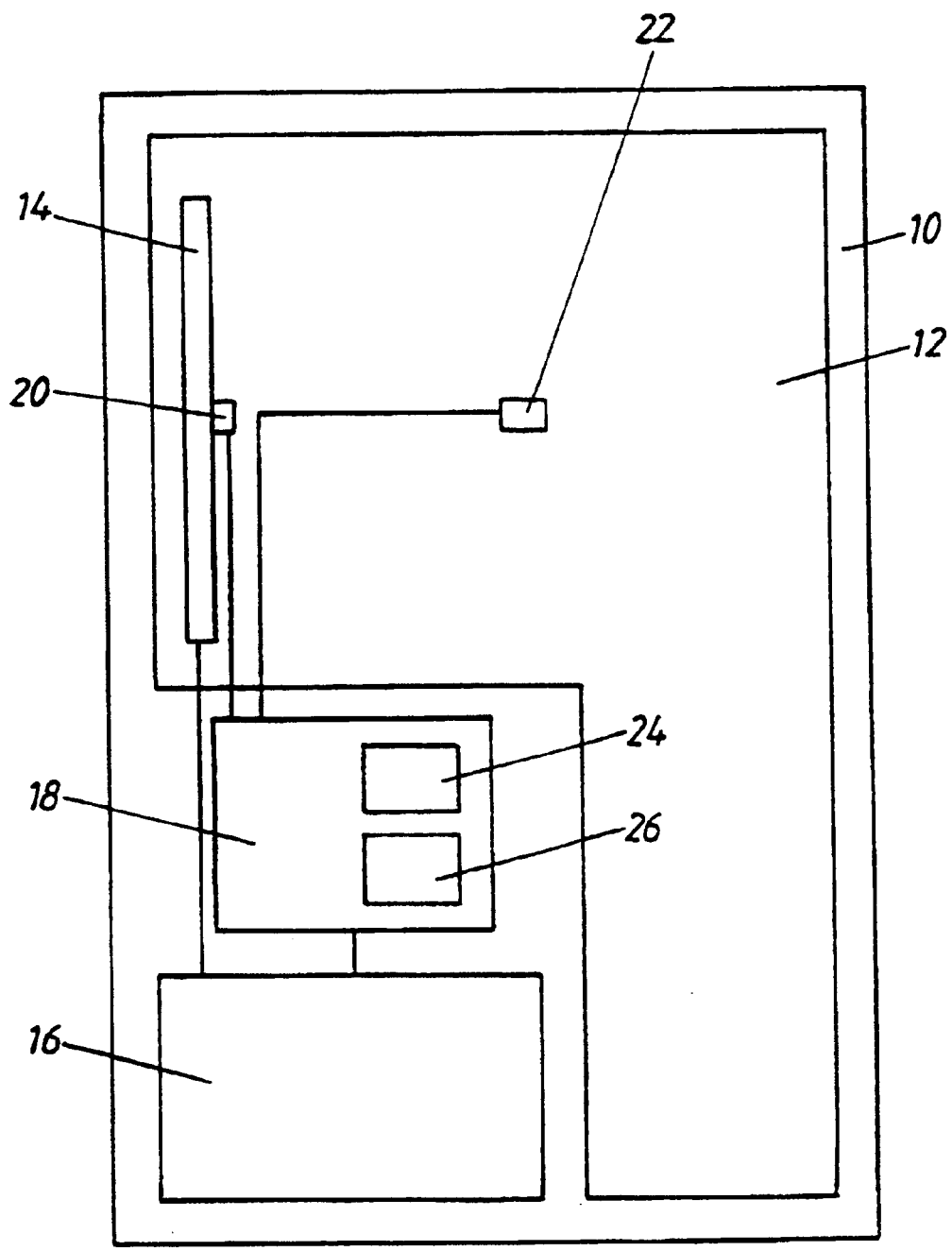
FIG. 1 shows a schematic cross-section refrigerator compartement.

FIG. 1 is intended showing an elevation view of a cross-section of a cabinet 10. The cabinet 10 can be a refrigerator or a freezer cabinet having a space 12, which is refrigerated by an element 14 being part of an intermittent operating machine 16. The cabinet 10 has a control gear 18, consisting of a first means, i.e. a first temperature sensor 20, a second means, i.e. a second temperature sensor 22, a third means 24 and a fourth means 26. The first temperature sensor 20 is located, for example, on the refrigerating element 14 in the chilled space 12 and measures a controlling temperature $T_1$. The second temperature sensor 22 is located at a reference point, place of reference, in the space 12 and measures a current temperature $T_2$ in the refrigerated space 12. The third means 24 compiles an average temperature $T_{av}$, based on the current temperature. The fourth means 26 compiles a discrepancy between the average $T_{av}$ and a preset temperature $T_{set}$.

Preset Temperature $T_{set}$:

The preset temperature is the average temperature the user wants for the refrigerated space.

Controlling Temperature $T_1$:

The instantaneous temperature in a specific point in the refrigerated space, a temperature, which is used as a basis to regulate the average temperature at the reference point of the space. The controlling temperature $T_1$ can be the current temperature $T_2$ of the space, or another temperature in a fixed point in the refrigerated space. This fixed point can be chosen, e.g. so that variations of temperature at the point are sufficiently fast to correctly detect the moments, when the controlling temperature passes certain threshold values (the connect and disconnect temperatures).

Connect Temperature $T_{on}$:

A determined value for the controlling temperature $T_1$ where the refrigerating machine is turned "on" at the time the controlling temperature rises above the value $T_{on}$.

Disconnect Tempearature $T_{off}$:

A determined value for the controlling temperature $T_1$ where the refrigerating machine is switched "off" at the time the controlling temperature drops below the value $T_{off}$. The disconnect temperature $T_{off}$ is lower than the connect temperature $T_{on}$ for refrigerating applications (and vice versa for applications generating heat).

Current (Regulated) Temperature $T_2$ in the Refrigerated Space:

The current temperature in the refrigerated space at a reference point (place of reference) $T_2$, is the current temperature to be regulated.

Average Temperature $T_{av}$:

The average temperature of current temperatures measured in the refrigerated space during a full period.

A method to control the current temperature $T_3$ in the refrigerated space 12:

The space 12 can be the refrigerated space in a refrigerator or a freezer cabinet, which is refrigerated by the element 14 being part of the intermittently operating refrigerating machine 16. The first means 20 measures the controlling temperature $T_1$. As the controlling temperature $T_1$ rises above a first determined value $T_{on}$, the first means 20 gives an on-signal to the control gear 18 to start the refrigerating machine 16, whereupon a period "j" commences, and the space 12 is refrigerated. The controlling temperature $T_2$ drops below a second determined value $T_{off}$, lower than he first determined value, which entails the first means 20 to give an off-signal to the control gear 18 to switch off the refrigerating machine, in order that the space 12 will be warmed up due to heat leakage. The first means 20 gives an on-signal for starting the refrigerating machine anew, when the controlling temperature $T_1$ rises above the first determined value $T_{on}$, The controlling temperature will be swinging between a maximum and a minimum value during the time the refrigerating machine operates. The second means 22 measures the current temperature $T_2$ at he reference point in the space 12. It is intended that the average value of the current temperature $T_2$, during a full period shall be equal, or as close as possible equal, to the reset temperature $T_{set}$.

The third means 24 compiles the average temperature $T_{av}$, out of the current temperature $T_2$ in the space 12, according to the following relation:

$$T_{av,i} = ((i-1)/i) \times T_{av,i} + (1/i) \times T_{2,i}$$

where i=1,2, . . . ,N and $T_{2,i}$ is a measurement result of the current temperature. $T_{av,i}$ is, at a certain point of time, the average temperature of the current temperature $T_2$. $T_{av,N}$ is the last calculated average temperature out of the current temperature before the end of the period, which is equal to the average temperature of the current temperature during a full period, if the current temperature $T_2$ has been measured sufficiently frequent.

The fourth means 26 compiles the discrepancy $\Delta T$ between the average temperature $T_{av,N}$ of the current temperature and the preset temperature $T_{set}$. The discrepancy between the average temperature during the period and the preset temperature is calculated at the end of the period according to the following relation:

$$\Delta T = T_{av,N} - T_{set},$$

which results in, when the-discrepancy $\Delta T$ is greater than a predetermined value of discrepancy $\Delta T_{min}$, the connect and/or disconnect temperatures $T_{on}$, $T_{off}$ are changed according to a certain predetermined relation in such a manner, so that the discrepancy $\Delta T$ drops below $\Delta T_{min}$. This occur owing to the fourth means 26 action in increasing /decreasing the connect and/or disconnect temperatures in order to cancel the discrepancy.

The connect and disconnect temperatures are changed out of the following criteria:

when the average temperature $T_{av,N}$ is lower than the preset temperature $T_{set}$, the connect and/or disconnect temperatures are increased according to the relation:

$$T_{on,j+1} = T_{on,j} + K_{on} \times |\Delta T|$$

$$T_{off,j+1} = T_{off,j} + K_{off} \times |\Delta T|$$

When the average temperature $T_{av,N}$ is higher than the preset temperature $T_{set}$, the connect and/or disconnect temperatures are reduced according to the relation:

$$T_{on,j+1} = T_{on,j} - K_{on} \times |\Delta T|$$

$$T_{off,j+1} = T_{off,j} - K_{off} \times |\Delta T|$$

where the connect temperature $T_{on,j}$ is the value for the period "j" and $T_{on,j}$ is the value for the next period "j+1", and where the disconnect temperature $T_{off,j}$ is the value for the period "j", and $T_{off,j+1}$ is the value for the next period "j+1", and where the discrepancy $|\Delta T|$ is greater than the predetermined value of discrepancy $\Delta T_{min}$. $K_{on}$ and $K_{off}$ are numeric coefficients.

Figure 2:
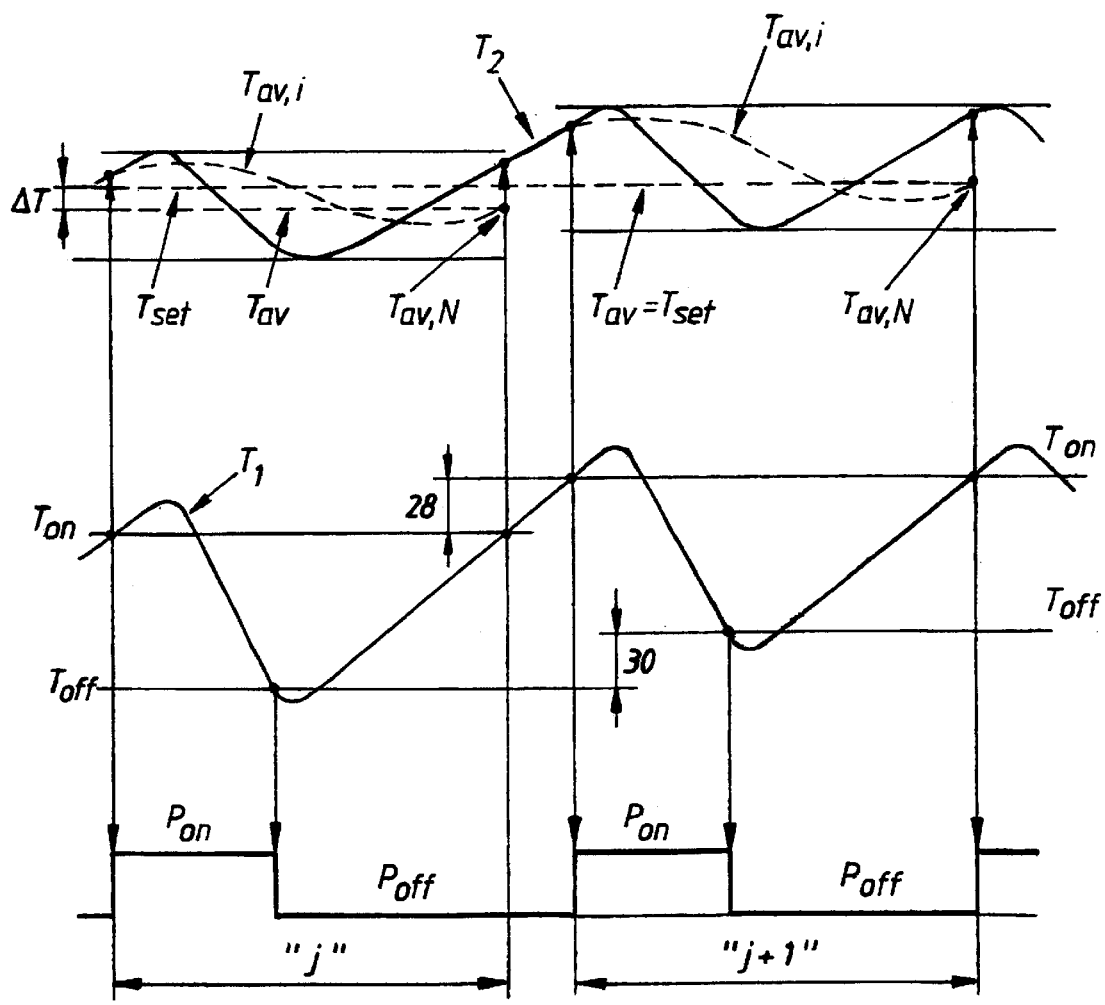
FIG. 2 shows temperature curves illustrating a raising of the controlling temperature from one period "j" to the next period "j+1".
Figure 3:
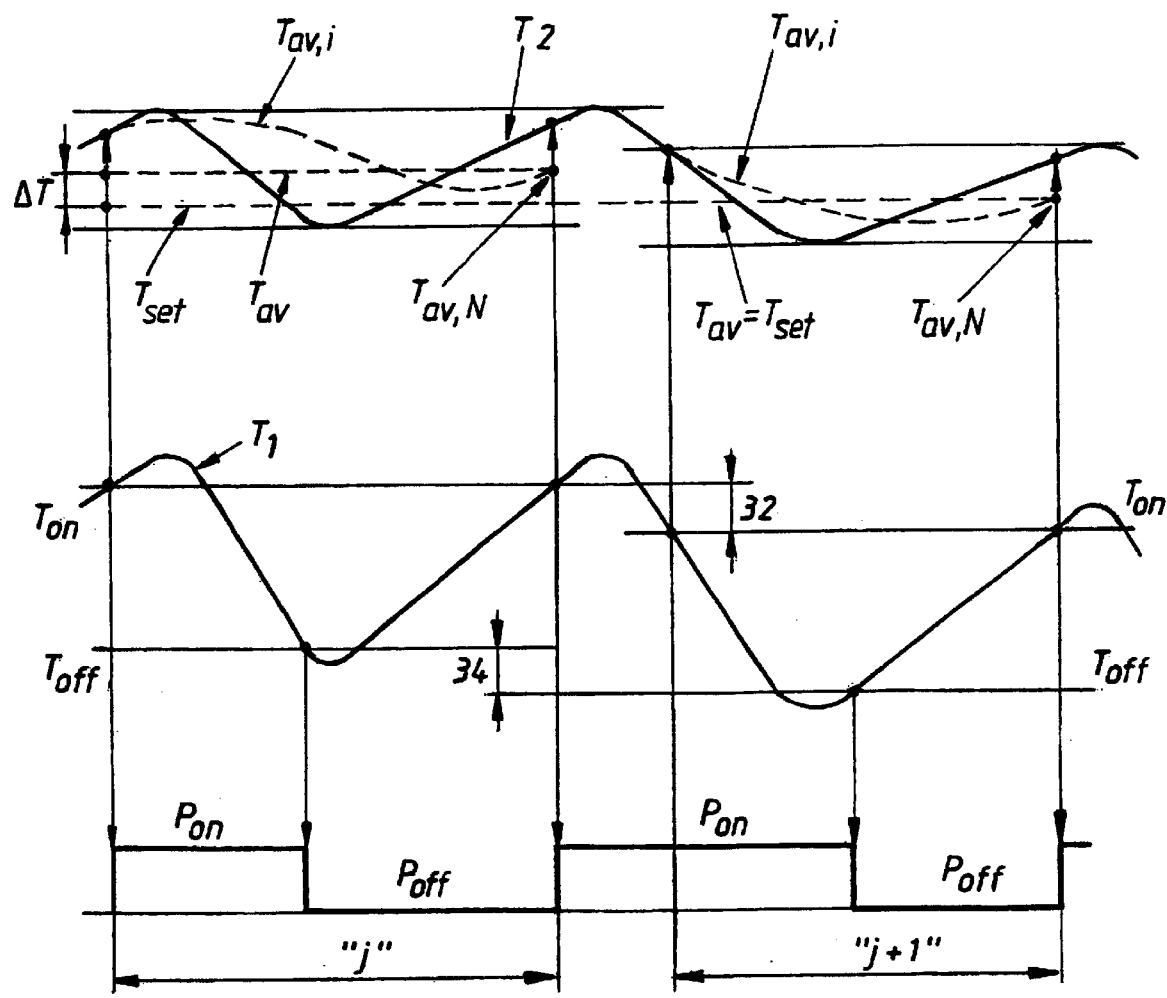
FIG. 3 shows temperature curves illustrating a lowering of the controlling temperature from one period "j" to the next period "j+1".

The FIGS. 2 and 3 shows temperature variations for the controlling temperature $T_1$ and for the current temperature $T_2$ in the refrigerated space 12 during two consecutive periods "j" and "j+1". When the controlling temperature $T_1$ rises above the connect temperature $T_{on}$, corresponding to the period "j", the first means 20 sends a connect signal to the control gear 18 to turn on the refrigerating machine 16, whereupon the period "j" starts and the space is refrigerated. The controlling temperature $T_1$ drops below the disconnect temperature $T_{off}$, corresponding to the period "j", which results in the first means 20 sending a switch off signal to the control gear 18 in order to disconnect the refrigerating machine 16, and based on heat leakage the space 12 will be warmed up. When the controlling temperature $T_1$ rises above $T_{on}$ anew the period "j" is finished. The third means 24 calculates the average value $T_{av,i}$ for the current temperature $T_2$ countinuously. The last calculated average temperature $T_{av,N}$ before the end of the period is equal to the average value $T_{av}$ for the current temperature $T_2$ during the period "j". The fourth means 26 establishes the discrepancy $\Delta T$ between the average temperature $T_{av,N}$ and the reset value $T_{set}$.

In FIG. 2 the average temperature $T_{av,N}$ for the period "j" is lower than the preset temperature $T_{set}$. In case the discrepancy $\Delta T$ is greater than the predetermined value $\Delta T_{min}$, the fourth means 26 increases the connect temperature $T_{on}$ with $K_{on} \times |\Delta T|$, wich in FIG. 2 is designated 28, and/or the disconnect temperature $T_{off}$ with $K_{off} \times |\Delta T|$, in FIG. 2 designated 30, in order to cancel the discrepancy. When the temperature $T_1$ rises above the new increased connect temperature $T_{on}$ for the period "j+1" the first means 20 anew gives an on signal to the control gear 18 to start the refrigerating machine 16. The period "j+1" ends when the control temperature $T_1$ rises above the connect temperature $T_{on}$ anew.

In FIG. 3 the average temperature $T_{av,N}$ for the period "j" is higher than the preset temperature $T_{set}$. In this case, as the discrepancy $\Delta T$ is greater than the predetermined value $\Delta T_{min}$, the fourth means 26 decreases the connect temperature $T_{on}$ with $K_{on} \times |\Delta T|$, designated 32, and/or the disconnect temperature $T_{off}$ with $K_{off} \times |\Delta T|$, designated 34, in order to cancel the discrepancy. The refrigerating machine 16 is turned on already at the end of the period "j". The period "j+1" starts when the controlling temperature $T_1$ drops below the new decreased connect temperature $T_{on}$ for the period "j+1", and ends when the controlling temperature $T_1$ rises above the new decreased connect temperature $T_{on}$. The connect and/or disconnect temperatures are increased or decreased after the period "j+1" again, if the discrepancy $\Delta T$ is greater than the predetermined value $\Delta T_{min}$.

A Second Embodiment

The difference in the second embodiment resides in that the first and second means 20 and 22 are one common means. The common means measures a temperature T at a reference point in the space 12. When the temperature T rises above a first determined value, the connect temperature $T_{on}$, the common means gives an on-signal to the control gear 18 to start the refrigerating machine 16, whereupon a period "j" starts and the space 12 is cooled down. As the temperature T drops below a second determined value, the disconnect tempearature $T_{off}$, lower than the first determined value, the common means 20 and 22 sends an off-signal to the control gear 18 to switch off the refrigerating machine 16; after that T will rise above the first determined value and the period "j" has come to an end. The control gear 18 has the task to eliminate the discrepancy between the average value $T_{av}$ of the temperature T, during a full period, and the preset temperature $T_{set}$, which means that the connect and/or disconnect temperatures will be changed during the operation of the refrigeration machine.

Temperature T in the Refrigerated Space:

The temperature T at a reference point (place of reference) in the refrigerated space 12. The temperature T shall be regulated so that the average temperature is equal to the preset temperature $T_{set}$.

Average Temperature $T_{av}$:

The average temperature $T_{av}$ of the temperature T measured for a full period in the reference point in the refrigerated space.

Connect Temperature $T_{on}$:

A definite value of the temperature T, where the refrigerating machine is turned on as soon as the temperature T rises above the value $T_{on}$.

Disconnect Temperature $T_{off}$:

A definite value of the temperature T, where the refrigerating machine 16 is switched off as soon as the temperature T drops below the value $T_{off}$. The disconnect temperature $T_{off}$ is lower than the connect temperature $T_{on}$ for refrigerator applications (an vice versa for applications generating heat).

The third means 24 compiles the average temperature $T_{av}$ for the temperature T in the space 12 according to the relation:

$$T_{av,i} = ((i-1)/i) \times T_{av,i-1} + (1/i) \times T_i,$$

where i=1,2, ... ,N and $T_i$ is one measured result for the temperature T. $T_{av,i}$ is the average temperature in respect of the temperature $T_1$ at a certain point of time. $T_{av,N}$ is the last calculated average temperature before the end of the period, which is equal to the average temperature of the temperature T, during a full period, in the case temperature T has been measured sufficiently frequent.

The fourth means 26 compiles the discrepancy $\Delta T$ between the average temperature $T_{av,N}$ and the preset temperature $T_{set}$ for the temperature T. The discrepancy between the average temperature during the period, and the preset temperature is calculated after the period according to the relation:

$$\Delta T = T_{av,N} - T_{set},$$

which result in, when the discrepancy is greater than a predetermined value of discrepancy $\Delta T_{min}$, the connect and/or disconnect temperatures $T_{On}$, $T_{off}$ are changed due to a certain predetermined relation in such a manner that the discrepancy $\Delta T$ declaines below the predetermined discrepancy $\Delta T_{min}$. This happens as the fourth means 26 direct the connect and/or disconnect temperatures to increase/decrease in order to cancel the discrepancy.

The connect and disconnect temperatures are changed according to the following criteria:

when the average temperature $T_{av,N}$ is lower than the preset temperature $T_{set}$, the connect and/or disconnect temperature are increased due to the relation:

$$T_{on,j+1} = T_{on,j} + K_{on} \times |\Delta T|$$

$$T_{off,j-1} = T_{off,j} + K_{off} \times |\Delta T|$$

when the average temperature $T_{av,N}$ is higher than the preset temperature $T_{set}$, the connect and/or disconnect temperatures are decreased due to the relation:

$$T_{on,j+1} = T_{on,j} - K_{on} \times |\Delta T|$$

$$T_{off,j+1} = T_{off,j} - K_{off} \times |\Delta T|$$

where the connect temperature $T_{on,j}$ is the value for the period "j", and $T_{on,j+1}$ is the value for the next period "j+1", and where the disconnect temperature $T_{off,j}$ is the value for the period "j", and $T_{off,j+1}$ is the value for the next period "j+1", and where the discrepancy |ΔT| is greater then the predetermined value of discrepancy $\Delta T_{min}$.

What is claimed is:

1. A device for controlling a temperature (T) in a space (12) in a cabinet (10), which space is refrigerated by an element (14) being kept cold by an intermittently operating refrigerating machine (16), characterized in that the device has a common means (20 and 22) registering the temperature in the space, which common means is arranged to start the refrigerating machine at a connect value ($T_{on}$) of the registered temperature, whereby a period of refrigeration ends and a new period of refrigeration starts, which common means is arranged to stop the refrigerating machine at a disconnect value ($T_{off}$) of the temperature, and which common means has a preset value ($T_{set}$) for the temperature in the space, that the device has a third means (24) continuously compiling an average value ($T_{av}$) of the temperature in the space during a present period of refrigeration, and that the device has a fourth means (26) for compiling a discrepancy (ΔT) between the average value and the preset value, where the magnitude of the discrepancy decides whether the connect and/or disconnect values shall be changed in order to have the temperature to approach the preset value ($T_{set}$).

2. Device for controlling according to claim 1, characterized in that the common means (20 and 22) is divided up in a first means (20) and a second means (22), the first means measures the temperature ($T_1$) at a selected reference point in the space and has the connect and disconnect values ($T_{on}$, $T_{off}$), that the second means measures a current temperature ($T_2$) in the space, that the third means (24) compiles an average value ($T_{av}$) during one period of the current temperature ($T_2$).

3. A method to control a temperature (T) in a space (12) of a cabinet (10), which space is refrigerated by an element (14) being kept cold by an intermittently operating refrigerating machine (16), characterized in that the temperature is controlled by a device, which has a common means (20 and 22) measuring the temperature, which common means has registered a connect value ($T_{on}$), a disconnect value ($T_{off}$) and a predetermined value ($T_{set}$) for the temperature in the space, which device has a third means (24) for compiling an average value ($T_{av}$) for the temperature during an operating period of the refrigerating machine, and which device has a fourth means (26) to compile a discrepancy (ΔT) between the average value and the preset value, and that the method to control the temperature consists of the following steps:

to measure the temperature (T), to start the refrigeration when the temperature passes the connect value, to stop the refrigeration when the temperature passes the disconnect value, to compile the average value of the temperature continuously, to compile the discrepancy between the average value and the preset value, and when the magnitude of the discrepancy is greater than a predetermined discrepancy ($\Delta T_{min}$), the connect and/or disconnect values will be changed in such a manner that the temperature approaches the preset value.

4. A method to control the temperature (T) according to claim 3, characterized in that the average value of the temperature go in the space continuously will be obtained according to relation:

$$T_{av,i}=((i-1)/i) \times T_{av,i-1}+(1/i) \times T_i.$$

5. A method to control the temperature (T) according to one of the claims 3 or 4, characterized in that the discrepancy, during the period, between the average value and the preset value will be obtained at the end of the period according to the relation:

$$\Delta T = T_{av,N} - T_{set}.$$

6. A method to control the temperature (T) according to one of the claims 3 to 4, characterized in that if the magnitude of the discrepancy is greater than a predetermined discrepancy ($\Delta T_{min}$) both the connect and disconnect values or just one of them will be increased according to the relation:

$$T_{on,j+1}=T_{on,j}+K_{on} \times |\Delta T|;$$

$$T_{off,j+1}=T_{off,j}+K_{off} \times |\Delta T|,$$

when the average temperature ($T_{av,N}$) is lower than the preset temperature.

7. A method to control the temperature (T) according to one of the claims 3 to 4, characterized in that if the magnitude of the discrepancy is greater that a predetermined discrepancy ($\Delta T_{min}$) both the connect and disconnect values or just one of them will be decreased according to the relation:

$$T_{on,j+1}=T_{on,j}-K_{on} \times |\Delta T|;$$

$$T_{off,j+1}=T_{off,j}-K_{off} \times |\Delta T|,$$

when the average temperature ($T_{av,N}$) is higher than the preset temperature.

8. A method to control a temperature ($T_2$) in a space (12) in a cabinet (10), which space is refrigerated by an element (14), being kept cold by an intermittently operating refrigerating machine (16), characterized in that the temperature is controlled by a device, which has a first means (20) measuring a regulating temperature ($T_1$), and which first means has a registered connect value ($T_{on}$) and a disconnect value ($T_{off}$), which device has a second means (22) measuring the temperature ($T_2$) in the space, and which second means has a preset value ($T_2$) in the space, and which second means has a preset value ($T_{set}$) for the temperature, and which device has a third means (24) for compiling an average value ($T_{av}$) of the temperature in the space during an operating period of the refrigerating machine, and which device has a fourth means (26) to compile a discrepancy (ΔT) between the average value and the preset value and that the method to control the temperature consists of the following steps:

to measure the regulating temperature ($T_1$), to measure the current temperature, to start the refrigeration when the regulating temperature passes the connect value, to stop the refrigeration when the regulating temperature passes the disconnect value, to compile the average value of the temperature continuously, to compile the discrepancy between the average value and the preset value, and in case the magnitude of discrepancy is greater than a predetermined discrepancy ($\Delta T_{min}$), the connect and/or disconnect values will be changed in such a manner that the temperature approaches the preset value.

9. A method to control the temperature ($T_2$) according to claim 8, characterized in that the average value of the temperature in the space continuously is obtained according to the relation:

$$T_{av,i}=((i-1)/i) \times T_{av,i-1}+(1/i) \times T_{2,i}.$$

10. A method to control the temperature ($T_2$) according to one of the claims 8 or 9, characterized in that the discrepancy during the period and the preset value is obtained at the end of the period according to the relation:

$$\Delta T = T_{av,N} - T_{set}.$$

11. A method to control the temperature ($T_2$) according to one of the claims 8 to 9, characterized in that if the magnitude of discrepancy is greater than a predetermined discrepancy ($\Delta T_{min}$) both the connect and the disconnect values, or just one of them will be increased according to the relation:

$$T_{on,j+1} = T_{on,j} + K_{on} \times |\Delta T|;$$

$$T_{off,j+1} = T_{off,j} + K_{off} \times |\Delta T|,$$

when the average temperature ($T_{av,N}$) is lower than the preset temperature.

12. A method to control the temperature ($T_2$) according to one of the claims 8 to 9, characterized in that is the magnitude of the discrepancy is greater than a predetermined discrepancy ($\Delta T_{min}$), both connect and disconnect values, or just one of them, will be decreased according to the relation:

$$T_{on,j+1} = T_{on,j} - K_{on} \times |\Delta T|;$$

$$T_{off,j-1} = T_{off,j} + K_{off} \times |\Delta T|,$$

when the average temperature ($T_{av,N}$) is higher than the preset temperature.

* * * * *

UNITED STATES PATENT AND TRADEMARK OFFICE
CERTIFICATE OF CORRECTION

PATENT NO. : 6,591,622 B1
DATED : July 15, 2003
INVENTOR(S) : George Gherman et al.

It is certified that error appears in the above-identified patent and that said Letters Patent is hereby corrected as shown below:

Title page,
Item [22], PCT filed, please delete "Nov. 21, 1999", and insert therefor -- Oct. 21, 1999 --.
Item [57], ABSTRACT,
Line 13, please delete "forth", and insert therefor -- fourth --.

Column 3,
Line 59, please delete "$T_2$", and insert therefor -- $T_1$ --.
Line 60, please delete "he", and insert therefor -- the --.

Column 4,
Line 3, please delete "he", and insert therefor -- the --.
Line 58, please delete "$T_{on,j}$", and insert therefor -- $T_{on,j+1}$ --.

Column 5,
Line 14, please delete "reset", and insert therefor -- preset --.

Column 6,
Line 42, please delete "$T_{0n}$", and insert therefor -- $T_{on}$ --.
Line 56, please delete "$T_{off,j-1} = T_{off,j} + K_{off} x |\Delta T|$", and insert therefor -- $T_{off,j+1} = T_{off,j} + K_{off} x |\Delta T|$ --.

Column 7,
Line 61, please delete "go".

Signed and Sealed this

Third Day of August, 2004

JON W. DUDAS
*Acting Director of the United States Patent and Trademark Office*